United States Patent Office 3,655,788
Patented Apr. 11, 1972

3,655,788
PHOSGENE AS A NOVEL CATALYST FOR THE ABNORMAL ADDITION OF HBr TO ALPHA-OLEFINS
Robert M. Thomas and Fred R. Gerns, West Lafayette, Ind., assignors to Great Lakes Chemical Corporation, West Lafayette, Ind.
No Drawing. Filed July 3, 1969, Ser. No. 839,064
Int. Cl. C07c 17/08
U.S. Cl. 260—663
9 Claims

ABSTRACT OF THE DISCLOSURE

Long chain alpha-olefins of at least six carbon atoms undergo anti-Markownikoff addition when treated with hydrogen bromide in the presence of phosgene to produce primary alkyl bromides.

This invention relates to the preparation of alkyl bromides by anti-Markownikoff, or free radical addition of hydrogen bromide to alpha-olefinic hydrocarbons. More particularly, the invention relates to a novel catalyst for effecting this addition.

BACKGROUND OF INVENTION AND PRIOR ART

Hydrogen bromide adds to alpha-olefins to give primary and secondary isomeric alkyl bromides. The isomer which predominates is determined by the conditions of the reaction, which in turn control the mechanism of the addition. When an olefin adds hydrogen bromide, the reaction product is usually the secondary bromide rather than the n-alkyl bromide. This type of addition has become known to the art as the Markownikoff or "normal" addition.

Although the normal addition also produces some primary halide, a mixture of primary and secondary isomers is usually formed. Moreover, the ratio of primary to secondary varies and is not reproducible. It was later discovered that the ratio of isomers in the product is dependent on the exposure of the olefin to air and that abnormal addition is enhanced by the presence of air or peroxide in the reaction mixture.

The patent literature is replete with examples of the use of various peroxide or oxygen derivatives as catalysts for the production of primary alkyl halides. U.S. Pat. 3,108,141 teaches the abnormal addition in the presence of molecular oxygen. U.S. Pat. 2,790,013 discloses that it is old in the art to use peroxides, ozone or acetone as the free radical initiator and further suggests and claims activated carbon as the free radical initiator. U.S. Pat. 3,321,538 claims a continuous process for the preparation of n-alkyl bromides which entails treating the olefin with ozone to create an ozonide preparatory to the addition of HBr. U.S. Pat. 3,336,403 describes another continuous process with another variation of using an ozonide catalyst. In addition, U.S. Pat. 3,401,203 teaches that any of the known free radical initiators such as ultraviolet light, peroxides, air, oxygen, ozone, etc., may be used as abnormal addition catalysts favoring formation of primary substitution products.

UTILITY

Primary alkyl bromides are important intermediates for the production of many organic compounds. Long chain fatty alcohols are made by hydrolyzing the alkyl bromide with caustic. Alkyl bromides when treated with an alkali metal cyanide undergo an exchange reaction to produce the corresponding alkyl nitrile. The alkyl nitrile, in turn, can be treated with sulfuric acid to form an iminosulfate, which in turn can be hydrolized to produce a fatty amide type of surfactant. The alkyl bromide can also be treated in the manner described in U.S. Pat. 3,401,203 to prepare the corresponding amines.

OBJECTS OF THE INVENTION

It is a general object of this invention to provide a novel process for the free radical addition of hydrogen bromide to an alpha-olefin using phosgene as the catalyst to produce a primary alkyl bromide.

A further object of this invention is to provide a novel process for the production of primary alkyl bromides from alpha-olefins in which ratio of primary to secondary isomers is improved.

An additional object is to provide a novel process for the conversion of alpha olefins having 8 to 10 carbon atoms to primary alkyl bromides whereby an improved rate of conversion is attainable.

Another object is to provide a novel process for the conversion of alpha-olefins to primary alkyl bromides which yields a purer product.

DESCRIPTION OF THE INVENTION

According to this invention, primary alkyl bromides are produced by the addition of anhydrous hydrogen bromide to an alpha olefin of at least 6 carbon atoms in the presence of phosgene.

In the anti-Markownikoff addition of HBr to an alpha-olefin of at least six carbon atoms, the catalyst serves the dual function of causing the reaction to be a free radical reaction, thereby producing the primary alkyl bromide as the major product, and of increasing the conversion rate. Phosgene has been found to catalyze the abnormal addition of HBr to higher alpha-olefins.

The alpha olefins employed in the process contain at least 6 carbon atoms, preferably from 6 to 20 carbon atoms, more preferably from 8 to 18 carbon atoms and most preferably from 8 to 10 carbon atoms.

The hydrogen bromide employed in the reaction can be commercial grade anhydrous hydrogen bromide and the phosgene can be commercially available technical grade phosgene.

Phosgene is mixed with the HBr and contacted in a reaction zone with the olefin to cause the exothermic addition reaction. The product is removed from the reaction zone; the unreacted olefin is removed from the mixture and returned to the reaction zone; the primary isomer is then separated from the secondary isomer by distillation. Phosgene provides a high primary-secondary isomer ratio (1°/2° ratio) across the entire range of olefins and is also found to provide a higher percent conversion in the olefin range of 8–10 carbon atoms. The conversion rate decreases as the olefin size increases but the primary-secondary isomer ratio remains high throughout. In a hydrobromination reaction the isomer ratio is of greater importance than the percent conversion. Particularly in a continuous process it is relatively easy and inexpensive to strip the unreacted olefin from the brominated product and recycle the olefin, but it is more difficult and costly to separate the primary and secondary isomers of the brominated product.

The molar ratio of olefin to HBr does not affect the primary to secondary bromide ratio to any great extent but does affect conversion rates. Preferably, a molar ratio of olefin to HBr from 0.8:1 to 1.2:1 is employed. To ensure optimum conversion of olefin to alkyl halide, a molar ratio of olefin:HBr of less than 1 is employed. Moreover, in a continuous process in which unreacted olefin is recycled, a ratio of less than 1 is definitely preferred.

The ratio of phosgene to olefin is not critical. Only small amounts of phosgene are required, e.g., about 0.5 to 1.5% by weight of olefin. Below 0.5% the ratio of primary to secondary isomer may drop. The tendency of the isomer ratio to decrease has been found to be chain length dependent. The ratio decreases with increasing chain length. Although there is no known disadvantage to using a greater amount of phosgene it is preferable from an economical standpoint to use a ratio of phosgene to olefin in the range of 0.5 to 1.5%, most preferably 0.5 to 1%.

The phosgene and hydrogen bromide are mixed together before being fed to the reaction zone in a weight percent ratio of phosgene to HBr in the range of 0.5 to 5% preferably 1–3%.

The presence of water is undesired in the reaction. The olefin can be dried and impurities removed by being passed through a column of alumina and $CaSO_4$, prior to addition to the reaction zone. However, the effect of such treatment on the course of the reaction is minimal where using commercial grade olefins, which already are quite pure. In most of the examples described hereinafter the olefin had not been treated prior to use. It has, however, been found advantageous to dry the HBr and phosgene by passing the gases through a Drierite chamber. The overall purity of the olefin affects the percent conversion and isomer ratio and it is preferred to use olefins as free as possible of isomers.

In the examples set forth below "Gulf" brand olefins (Gulf Oil Co., Pittsburgh, Pa.) having the specifications shown in Table I were used.

In a continuous type of operation, the hydrocarbon charge stock is fed to contactors in which intimate contact between the olefin and the HBr-phosgene mixture is maintained by countercurrent mixing. The effluent from the contactors is treated to remove unreacted starting material, which is recycled to the reaction zone. The product is then fractionated to separate the isomers.

EXAMPLES

The process was conducted in a continuous manner to compare phosgene as a catalyst to air. Air is considered representative of the oxygen peroxide, ozone type catalysts. In addition air would be most closely competitive from a cost standpoint to using phosgene. The advantage of the gaseous catalyst is ease of handling; uniformity of the catalyst:HBr ratio in contact with the olefin; and absence of impurities which result from using an organic peroxide or ozonide.

The comparative reactions are conducted in a glass column of a 1″ diameter packed with ³⁄₁₆″ glass helices. The column is approximately 6 ft. in length and is provided with a water jacket for cooling. The olefin is fed into the top of the reactor from an olefin reservoir. The HBr and catalyst are each dried by being passed through a Drierite column, mixed together and fed to the bottom of the reactor column. The descending olefin and ascending mixture of catalyst and HBr are mixed together by

TABLE I.—ALPHA OLEFIN PROPERTIES

| | Hex-ene-1 | Oct-ene-1 | Dec-ene-1 | Dodec-ene-1 | Tetra-dec-ene-1 | Hexa-dec-ene-1 | Octa-dec-ene-1 | Eico-sene-1 |
|---|---|---|---|---|---|---|---|---|
| Composition (sales specifications); hydrocarbon type, chromatography: | | | | | | | | |
| n-Alpha olefins, weight percent, minimum | 96.0 | 95.5 | 94.6 | 93.6 | 92.6 | 90.6 | 88.6 | 86.6 |
| Monolefins, weight percent, minimum | 98.5 | 98.5 | 98.5 | 98.5 | 98.5 | 98.5 | 98.5 | 98.5 |
| Saturates, weight percent, maximum | 1.5 | 1.5 | 1.5 | 1.5 | 1.5 | 1.5 | 1.5 | 1.5 |
| Carbon No., chromatography: | | | | | | | | |
| Carbon No. | 6 | 8 | 10 | 12 | 14 | 16 | 18 | 20 |
| Weight percent, minimum | 99 | 99 | 98 | 97 | 96 | 95 | 94 | 92 |
| Color, Saybolt | (1) | (1) | (1) | (1) | (1) | (1) | (1) | (1) |
| Appearance | (2) | (2) | (2) | (2) | (2) | (2) | (2) | (2) |
| Physical properties (typical analyses): | | | | | | | | |
| Specific gravity, 60°/60° F | .6774 | .7184 | .7443 | .7617 | .7745 | .7842 | ³.7919 | ³.7980 |
| Distillation, ASTM D1078: | | | | | | | | |
| 5% over, ° C., minimum | 60 | 118 | 164 | 205 | 240 | 270 | (4) | (4) |
| 95% over, ° C., maximum | 66 | 128 | 175 | 220 | 255 | 300 | (4) | (4) |
| Freezing point, ° C., maximum | | | | | | 4 | 18 | 29 |

¹ Not darker than +30.
² Clear and free of visible impurities.
³ For undercooled liquid below normal freezing point.
⁴ Beyond scope of method.

The reaction is temperature-dependent, and it is preferable to cool the reaction zone. The reaction is exothermic and produces a temperature rise if not controlled. The reactor should preferably be maintained between 0 and 50° C. most preferably 0–30° C. Higher temperatures tend to cause erratic results and some decrease in the isomer ratio.

The phosgene may be introduced to the reaction zone first or in combination with the HBr. In view of the nature of the material it has been found most preferable from the standpoint of safety and convenience to add the HBr and phosgene to the reaction zone as a mixture. In this manner HBr gas and phosgene gas can be metered into a mixing tank, fed through drying tubes and bubbled into the olefin in a uniform manner.

The reaction may be carried out in an inert solvent for those olefins which are solids under standard conditions.

The present process may be carried out in batch or continuous type operation. In batch operation the olefin is introduced into the reactor and agitated. The HBr and phosgene are mixed and then introduced beneath the surface of the olefin. The reactor is preferably cooled to maintain the reaction temperature between 0–30° C. After the required amount of HBr has been introduced into the reaction, the mixture is allowed to stand until the reaction is complete. The mixture is then stripped of olefin and the mixed isomers are fractionated.

the countercurrent flow and exothermically react on the packing material surface. The brominated olefin is removed from the bottom of the column at intervals. The portion removed during each interval is referred to as a cut. The time and temperature range for each cut is recorded. The top of the reactor is vented to a water trap which collects unreacted HBr.

The HBr balance is determined by titrating aliquots of the cuts and the water trap.

An aliquot of the cut is washed with water, dried and analyzed by vapor phase chromatography to determine percent conversion and the isomer ratio. In continuous operation the mixture removed from the reactor is stripped to remove unreacted olefin and the unreacted olefin recycled.

Table II shows the results of treating 1-octene in a continuous process as described above with oxygen (air) and phosgene, respectively, as catalyst in a number of runs designated A, B, C, D and E. A number of cuts were taken from each run. Run E was the process of this invention using phosgene as catalyst.

Table III gives the results of the use of oxygen (air) and phosgene in the hydrobromination of 1-decene.

Table IV gives the results of the use of oxygen (air) and phosgene in the hydrobromination of 1-tetradecene.

Table V gives the results of the use of no catalyst, oxygen (air) and phosgene in the hydrobromination of 1-octadecene.

TABLE II.—HYDROBROMINATION OF GULF 1-OCTENE

| | Reaction time, minutes | Reaction temperature range | Catalyst, concentration on— | | Feed rates, moles/hr. | | Olefin: HBr, molar ratio | Percent conversion on— | | 1°:2° isomer ratio |
|---|---|---|---|---|---|---|---|---|---|---|
| | | | Olefin | HBr | Olefin | NBr | | Olefin | HBr | |
| Run and cut: | | | | | | | | | | |
| A-1 | 15 | 17-32 | O₂ | 0.43 | 0.56 | 3.34 | 3.5 | 0.95 | 98 | 93 | 8.6 |
| A-2 | 15 | 17-66 | O₂ | 0.44 | 0.56 | 3.2 | 3.5 | 0.91 | 99 | 90.5 | 7.0 |
| A-3 | 13 | 16-54 | O₂ | 0.44 | 0.56 | 3.2 | 3.5 | 0.91 | 99 | 90 | 7.1 |
| A-4 | 14 | 16-70 | O₂ | 0.46 | 0.59 | 3.08 | 3.36 | 0.92 | 99 | 90.5 | 5.6 |
| Average | 14 | 16-55 | O₂ | 0.44 | 0.56 | 3.2 | 3.46 | 0.92 | 99 | 91 | 7.1 |
| B-1 | 15 | 18-56 | O₂ | 0.57 | 0.79 | 2.44 | 2.54 | 0.96 | 97 | 93 | 11.3 |
| B-2 | 15 | 17-62 | O₂ | 0.43 | 0.55 | 3.33 | 3.57 | 0.93 | 98 | 91.5 | 6.8 |
| B-3 | 15 | 16-56 | O₂ | 0.39 | 0.59 | 3.7 | 3.24 | 1.13 | 88 | 99 | 6.5 |
| B-4 | 15 | 16-58 | O₂ | 0.37 | 0.61 | 3.84 | 3.21 | 1.20 | 83 | 99.5 | 6.3 |
| Average | 15 | 17-58 | O₂ | 0.44 | 0.63 | 3.43 | 3.14 | 1.05 | 91.5 | 95.6 | 7.7 |
| C-2 | 18 | 17-25 | O₂ | 0.34 | 0.58 | 3.51 | 2.91 | 1.21 | 83 | 99 | 9.0 |
| C-3 | 27 | 16-23 | O₂ | 0.29 | 0.47 | 4.13 | 3.60 | 1.15 | 87 | 99 | 9.2 |
| C-4 | 30 | 16-20 | O₂ | 0.43 | 0.70 | 2.82 | 2.42 | 1.17 | 86 | 99 | 7.1 |
| C-5 | 27 | 16-20 | O₂ | 0.30 | 0.51 | 3.98 | 3.34 | 1.19 | 84 | 99 | 8.0 |
| C-6 | 16 | 16-18 | O₂ | 0.34 | 0.51 | 3.6 | 3.23 | 1.11 | 90 | 99 | 8.5 |
| Average | 23 | 16-21 | O₂ | 0.34 | 0.55 | 3.61 | 3.10 | 1.16 | 86 | 99 | 8.3 |
| E-1 | 54 | 24-54 | COCl₂ | 2 | 2.6 | 3.56 | 3.2 | 1.11 | 90 | 100 | 10 |
| E-2 | 51 | 19-32 | COCl₂ | 0.5 | 1.1 | 3.76 | 2.3 | 1.64 | 54 | 89 | 13 |
| E-3 | 55 | 20-36 | COCl₂ | 0.7 | 1.6 | 3.49 | 3.17 | 1.11 | 81 | 90 | 12 |
| Average | 53 | 21-41 | COCl₂ | 1.1 | 1.8 | 3.70 | 2.89 | 1.29 | 75 | 93 | 12 |
| D-3 | 15 | 16-28 | O₂ | 0.37 | 0.51 | 3.72 | 3.74 | 1 | 98 | 97 | 21.2 |
| D-4 | 16 | 15-38 | O₂ | 0.39 | 0.51 | 3.70 | 3.90 | 0.95 | 98 | 93 | 21.2 |
| D-5 | 15 | 15-44 | O₂ | 0.30 | 0.39 | 4.72 | 4.92 | 0.96 | 98 | 94 | 13.4 |
| D-6 | 15 | 16-36 | O₂ | 0.41 | 0.57 | 3.45 | 3.43 | 1 | 99 | 98 | 16.1 |
| Average | 15 | 15-36 | O₂ | 0.37 | 0.49 | 3.89 | 3.99 | 0.98 | 98 | 95 | 18 |

TABLE III.—HYDROBROMINATION OF 1-DECENE

| | Reaction time, minutes | Reaction temperature range | Catalyst, concentration on— | | Feed rates, moles/hr. | | Olefin: HBr, molar ratio | Percent conversion on— | | 1°:2° isomer ratio |
|---|---|---|---|---|---|---|---|---|---|---|
| | | | Olefin | HBr | Olefin | NBr | | Olefin | HBr | |
| Cut: | | | | | | | | | | |
| F-2 | 16 | 13-16 | O₂ | 0.30 | 0.66 | 3.19 | 2.58 | 1.23 | 81 | 99 | 5.4 |
| F-3 | 33 | 14-18 | O₂ | 0.30 | 0.54 | 3.27 | 3.14 | 1.04 | 96 | 99 | 5.3 |
| F-4 | 53 | 14-20 | O₂ | 0.38 | 0.68 | 3.0 | 2.90 | 1.03 | 96.5 | 99 | 5.5 |
| F-5 | 44 | 14-19 | O₂ | 0.27 | 0.50 | 3.61 | 3.36 | 1.08 | 93 | 99 | 7.6 |
| Average | 36.5 | 14-18 | O₂ | 0.31 | 0.59 | 3.27 | 2.99 | 1.09 | 91 | 99 | 5.5 |
| G-1 | 50 | 20-52 | COCl₂ | 1.35 | 2.6 | 3.19 | 2.83 | 1.13 | 74 | 100 | 10.2 |
| G-2 | 53 | 28-48 | COCl₂ | 1.4 | 2.75 | 3.01 | 2.70 | 1.11 | 90 | 100 | 15.3 |
| G-3 | 23 | 20-30 | COCl₂ | 1.4 | 2.7 | 3.05 | 2.80 | 1.09 | 91.5 | 100 | 15.3 |
| G-4 | 30 | 26-35 | COCl₂ | 1.44 | 3.0 | 2.98 | 2.48 | 1.20 | 83 | 100 | 21.8 |
| Average | 39 | 27-41 | COCl₂ | 1.4 | 2.8 | 3.06 | 2.70 | 1.13 | 84.5 | 100 | 15.6 |

TABLE IV.—HYDROBROMINATION OF 1-TETRADECENE

| | Reaction time, minutes | Reaction temperature range | Catalyst, concentration on— | | Feed rates, moles/hr. | | Olefin: HBr, molar ratio | Percent conversion on— | | 1°:2° isomer ratio |
|---|---|---|---|---|---|---|---|---|---|---|
| | | | Olefin | HBr | Olefin | NBr | | Olefin | HBr | |
| Cut: | | | | | | | | | | |
| H-1 | 47 | 16-35 | O₂ | 0.24 | 0.75 | 2.95 | 2.35 | 1.28 | 80 | 92.3 | 15.4 |
| H-2 | 28 | 20-23 | O₂ | 0.20 | 9.99 | 4.22 | 2.02 | 2.09 | 48 | 92.3 | 22.8 |
| H-3 | 46 | 18-23 | O₂ | 0.23 | 0.89 | 3.5 | 2.22 | 1.58 | 75 | 92.3 | 20 |
| H-4 | 30 | 16-23 | O₂ | 0.20 | 0.55 | 4.08 | 3.62 | 1.13 | 89 | 92.3 | 21.6 |
| H-5 | 40 | 15-23 | O₂ | 0.28 | 0.71 | 2.96 | 2.8 | 1.05 | 90 | 94.6 | 23.8 |
| Average | 38 | 17-25 | O₂ | 0.23 | 0.78 | 3.54 | 2.6 | 1.36 | 76.4 | 93.4 | 20.7 |
| O-1 | 40 | 20-34 | COCl₂ | 1.0 | 3.0 | 2.96 | 2.48 | 1.19 | 45 | 54 | 13.8 |
| O-2 | 43 | 16-19 | COCl₂ | 1.1 | 2.5 | 2.75 | 2.90 | 0.95 | 11 | 10.5 | 12.1 |

TABLE V.—HYDROBROMINATION OF 1-OCTADECENE

| | Reaction time, minutes | Reaction temperature range | Catalyst, concentration on— | | Feed rates, moles/hr. | | Olefin: HBr, molar ratio | Percent conversion on— | | 1°:2° isomer ratio |
|---|---|---|---|---|---|---|---|---|---|---|
| | | | Olefin | HBr | Olefin | NBr | | Olefin | HBr | |
| Cut: | | | | | | | | | | |
| K-1 | 39 | 26-30 | None | | | 2.42 | 2.12 | 1.14 | 3.5 | 4 | |
| K-2 | 38 | 26-29 | ...do | | | 2.48 | 1.55 | 1.60 | 2.7 | 2.7 | |
| L-1 | 43 | 24-39 | O₂ | 0.29 | 0.9 | 2.19 | 2.17 | 1.01 | 76 | 76.5 | 29 |
| L-2-5 | 39 | 27-41 | O₂ | 0.24 | 0.2 | 2.6 | 1.9 | 1.13 | 79 | 89 | 46.5 |
| L-1 | 37 | 29-36 | O₂ | 0.15 | 0.57 | 2.54 | 2.18 | 1.17 | 81 | 95 | 41 |
| L-2 | 40 | 35-43 | O₂ | 0.17 | 0.54 | 2.35 | 2.31 | 1.02 | 84 | 85 | 25 |
| L-3 | 45 | 35-46 | O₂ | 0.19 | 0.55 | 2.09 | 2.26 | 0.925 | 80 | 74 | 32 |
| L-4 | 39 | 35-44 | O₂ | 0.16 | 0.49 | 2.42 | 2.55 | 0.95 | 87 | 82 | 26 |
| L-5 | 39 | 44-46 | O₂ | 0.16 | 0.47 | 2.42 | 2.64 | 0.92 | 81 | 74 | 56 |
| Average | 40 | 35-43 | O₂ | 0.17 | 0.52 | 2.36 | 2.39 | 1.00 | 83 | 82 | 36 |
| M | 162 | 30-45 | O₂ | 0.15 | 0.52 | 2.58 | 2.38 | 1.08 | 70 | 76 | >60 |
| N-1 | 42 | 26-35 | COCl₂ | 1.05 | 3.1 | 2.24 | 2.40 | 0.93 | 40 | 38 | 78 |
| N-2 | 42 | 25-26 | COCl₂ | 1.05 | 3.2 | 2.24 | 2.30 | 0.97 | 20 | 19 | 100 |

Results

The percent conversion, percent HBr in product and the primary-secondary isomer ratio were determined by vapor phase chromatography using an F & M 300® manufactured by F & M Scientific Corporation and a column of Haloport F, 5% D.C. 200 obtained from Hewlett Packard Corp.

In the primary-secondary ratio, secondary bromides include not only the 2-bromoalkanes but other isomers such as 3-bromo-alkanes and branched chain bromides. These isomers arise in part from double bond migration in the olefin during the reaction.

It was found that phosgene generally gave higher primary-secondary isomer ratio than oxygen although the conversion ratio became lower as the molecule exceeded $C_{14}$.

The air catalyzed reaction gave erratic results for the isomer ratio in the area of $C_6$-$C_{10}$. As can be seen from Table II the ratio of 1°/2° for the air catalized process is extremely erratic. Although occasionally a high ratio is obtained (Run D) usually low ratios of about 5-7 to 1 are obtained. In contradistinction, from run-to-run and from cut-to-cut within a run, phosgene not only produces consistently high ratios but it also gives good conversion rates. Excellent conversion rates are obtained with straight chain olefins. In general the phosgene catalyst left a cleaner product which contained less insoluble by-products.

What I claim is:

1. A process for converting an alpha-olefin containing at least 6 and up to 20 carbon atoms predominantly to a primary alkyl bromide which comprises reacting said alpha-olefin with hydrogen bromide in the presence of phosgene as a catalyst for the reaction at a temperature of about 0 to 50° C.

2. A process according to claim 1 wherein the molar ratio of said olefin to HBr is 0.8:1 to 1.2:1 and the weight percent ratio of phosgene to olefin is 0.5 to 1.5%.

3. A process according to claim 2 wherein the olefin contains 8-18 carbon atoms.

4. A process according to claim 3 wherein the olefin contains 8-10 carbon atoms.

5. A process according to claim 2 which comprises the steps of
 (a) mixing HBr and phosgene;
 (b) continuously introducing a stream of the mixture of HBr and phosgene to a reaction zone;
 (c) continuously introducing a stream of the alpha-olefin to said reaction zone;
 (d) counter-currently mixing the stream of olefin and the stream of HBr and phosgene until the reaction of the HBr with the olefin is substantially complete;
 (e) continuously removing the liquid phase from the reaction zone;
 (f) continuously stripping unreacted olefin from the reacted liquid phase; and
 (g) recovering the resulting isolated alkyl bromide reaction product.

6. A process according to claim 5 wherein the temperature of the reaction zone is maintained between 0 and 30° C.

7. A process according to claim 6 wherein the molar ratio of said olefin to HBr is 0.8:1 to 1.2:1 and the weight percent ratio of phosgene to olefin is 0.5 to 1.5%.

8. A process according to claim 7 wherein the olefin contains 8-10 carbon atoms.

9. A process according to claim 8 wherein the molar ratio of olefin to HBr is 0.8:1 to 1:1 and the weight percent ratio of phosgene to olefin is 0.5 to 1%.

References Cited
UNITED STATES PATENTS 3,108,141  10/1963  Gasson et al. _____ 260—663

DANIEL D. HORWITZ, Primary Examiner

U.S. Cl. X.R.

252—426